United States Patent
Kuo et al.

(10) Patent No.: US 10,266,449 B2
(45) Date of Patent: Apr. 23, 2019

(54) METHOD FOR TREATING CLAY AND CLAY-BEARING AGGREGATES AND COMPOSITIONS THEREFOR

(71) Applicants: GCP Applied Technologies, Inc., Cambridge, MA (US); L'Beste Gat Ltd., Kangnam-Gu, Seoul (KR)

(72) Inventors: Lawrence Kuo, Acton, MA (US); Nathan Tregger, Billerica, MA (US); Ho Lee, Gyeonggi-do (KR); O-il Kwon, Gyeonggi-do (KR)

(73) Assignees: GCP Applied Technologies Inc., Cambridge, MA (US); L'Beste Gat Ltd., Seoul (KR)

( * ) Notice: Subject to any disclaimer, the term of this patent is extended or adjusted under 35 U.S.C. 154(b) by 0 days.

(21) Appl. No.: 15/274,246

(22) Filed: Sep. 23, 2016

(65) Prior Publication Data

US 2017/0008800 A1    Jan. 12, 2017

Related U.S. Application Data

(62) Division of application No. 14/395,603, filed as application No. PCT/EP2013/059303 on May 3, 2013, now abandoned.

(60) Provisional application No. 61/642,665, filed on May 4, 2012.

(51) Int. Cl.

| | |
|---|---|
| *C04B 24/26* | (2006.01) |
| *C08F 265/06* | (2006.01) |
| *C04B 40/00* | (2006.01) |
| *C04B 20/02* | (2006.01) |
| *C09K 8/467* | (2006.01) |
| *C04B 14/10* | (2006.01) |
| *C04B 24/02* | (2006.01) |
| *C04B 24/28* | (2006.01) |
| *C04B 24/30* | (2006.01) |
| *C08F 265/04* | (2006.01) |
| *C08K 3/34* | (2006.01) |
| *C04B 14/06* | (2006.01) |
| *C04B 24/24* | (2006.01) |
| *C08F 290/14* | (2006.01) |
| *C04B 103/00* | (2006.01) |
| *C04B 103/30* | (2006.01) |
| *C04B 103/32* | (2006.01) |

(52) U.S. Cl.
CPC .......... *C04B 24/2647* (2013.01); *C04B 14/06* (2013.01); *C04B 14/10* (2013.01); *C04B 20/02* (2013.01); *C04B 20/023* (2013.01); *C04B 24/023* (2013.01); *C04B 24/24* (2013.01); *C04B 24/267* (2013.01); *C04B 24/283* (2013.01); *C04B 24/30* (2013.01); *C04B 24/305* (2013.01); *C04B 40/0039* (2013.01); *C08F 265/04* (2013.01); *C08F 265/06* (2013.01); *C08F 290/142* (2013.01); *C08K 3/346* (2013.01); *C09K 8/467* (2013.01); *C04B 2103/0059* (2013.01); *C04B 2103/30* (2013.01); *C04B 2103/32* (2013.01)

(58) Field of Classification Search
CPC .............. C04B 24/2647; C04B 24/267; C04B 40/0039; C04B 20/02; C04B 14/10; C08F 265/06; C09K 8/467; C08K 3/346
See application file for complete search history.

(56) References Cited

U.S. PATENT DOCUMENTS

| | | |
|---|---|---|
| 3,377,274 A | 4/1968 | Burke et al. |
| 4,158,521 A | 6/1979 | Anderson |
| 4,250,112 A | 2/1981 | Lobach |
| 4,366,073 A | 12/1982 | McLaughlin et al. |
| 4,393,939 A | 7/1983 | Smith et al. |
| 4,447,342 A | 5/1984 | Borchardt et al. |
| 4,460,483 A | 7/1984 | Weaver |
| 4,471,100 A | 9/1984 | Tsubakimoto et al. |
| 4,749,444 A | 6/1988 | Lorz et al. |
| 5,099,923 A | 3/1992 | Aften et al. |
| 5,342,530 A | 8/1994 | Aften et al. |
| 5,393,343 A | 2/1995 | Darwin et al. |
| 5,661,206 A | 8/1997 | Tanaka et al. |
| 5,707,445 A * | 1/1998 | Yamato .................. C04B 24/165 106/724 |

(Continued)

FOREIGN PATENT DOCUMENTS

| | | |
|---|---|---|
| CN | 1743345 A | 3/2006 |
| CN | 101039886 A | 9/2007 |

(Continued)

OTHER PUBLICATIONS

International Search Report and Written Opinion dated Jul. 17, 2013 in corresponding PCT application No. PCT/EP2013/059303.
International Preliminary Report on Patentability dated Nov. 13, 2014 in corresponding PCT application No. PCT/EP2013/059303.
Chinese communication, with English translation, dated Apr. 13, 2016 in corresponding Chinese patent application No. 201380023219.7.
Office action dated Jan. 22, 2016 in co-pending U.S. Appl. No. 14/395,603.
Final rejection dated Jun. 28, 2016 in co-pending U.S. Appl. No. 14/395,603.

(Continued)

*Primary Examiner* — John E Uselding
(74) *Attorney, Agent, or Firm* — Nields, Lemack & Frame, LLC

(57) ABSTRACT

The present invention provides compositions and methods involving the use of a carboxylate graft polymer having high molecular weight and low ratio of acid-to-polyoxyalkylene groups. Such clay-mitigation is particularly useful for treating clay and clay-bearing aggregates, particularly those aggregates used for construction purposes. The present invention minimizes the need to wash the aggregates, thus preserving fine aggregates ("fines") content in construction materials, and thereby beneficiating the performance and/or properties of construction materials containing the clay-bearing aggregates.

8 Claims, No Drawings

(56) References Cited

U.S. PATENT DOCUMENTS

| | | | |
|---|---|---|---|
| 5,834,576 A * | 11/1998 | Nagano | C04B 24/2641 524/5 |
| 6,087,418 A * | 7/2000 | Yamashita | C04B 24/2647 524/4 |
| 6,174,980 B1 * | 1/2001 | Hirata | C04B 24/2647 524/4 |
| 6,187,841 B1 * | 2/2001 | Tanaka | C04B 24/2641 524/3 |
| 6,294,015 B1 * | 9/2001 | Yamashita | C04B 24/2647 106/724 |
| 6,352,952 B1 | 3/2002 | Jardine et al. | |
| 6,551,457 B2 | 4/2003 | Westman et al. | |
| 6,569,234 B2 | 5/2003 | Yamashita et al. | |
| 6,670,415 B2 | 12/2003 | Jardine et al. | |
| 8,425,680 B2 | 4/2013 | Jacquet et al. | |
| 8,834,626 B2 | 9/2014 | Jacquet et al. | |
| 2002/0193547 A1 * | 12/2002 | Yuasa | C04B 24/2658 526/312 |
| 2004/0238138 A1 | 12/2004 | Ishizaki et al. | |
| 2006/0030670 A1 | 2/2006 | Lee et al. | |
| 2006/0223914 A1 | 10/2006 | Yuasa et al. | |
| 2007/0261849 A1 | 11/2007 | Valenziano et al. | |
| 2007/0287794 A1 | 12/2007 | Alain et al. | |
| 2008/0060556 A1 | 3/2008 | Jacquet et al. | |
| 2012/0208945 A1 * | 8/2012 | Kuo | C04B 24/2688 524/445 |
| 2012/0316267 A1 | 12/2012 | Jacquet et al. | |
| 2015/0133584 A1 | 5/2015 | Kuo et al. | |

FOREIGN PATENT DOCUMENTS

| | | |
|---|---|---|
| CN | 101412790 A | 4/2009 |
| CN | 101475339 A | 7/2009 |
| EP | 0819651 A1 | 1/1998 |
| EP | 1179517 A2 | 2/2002 |
| EP | 1418194 A1 | 5/2004 |
| EP | 1799624 A2 | 6/2007 |
| EP | 1838643 A2 | 10/2007 |
| WO | 85/01935 A1 | 5/1985 |
| WO | 95/16643 A1 | 6/1995 |
| WO | 03/016379 A1 | 2/2003 |
| WO | 2009/127893 A1 | 10/2009 |
| WO | 2010/005117 A1 | 1/2010 |
| WO | 2010/112748 A1 | 10/2010 |

* cited by examiner

METHOD FOR TREATING CLAY AND CLAY-BEARING AGGREGATES AND COMPOSITIONS THEREFOR

This application is a divisional of U.S. patent application Ser. No. 14/395,603 filed Oct. 20, 2014, the disclosure of which is incorporated herein by reference in its entirety. U.S. patent application Ser. No. 14/395,603 is a 371 of PCT/EP2013/059303 filed May 3, 3013, which claims priority of U.S. Provisional Application 61/642,665 filed May 4, 2012.

FIELD OF THE INVENTION

This invention relates to the treatment of clay-bearing aggregates used for construction, and more particularly to the use of a carboxylate graft polymer having high molecular weight and low ratio of carboxylic acid to polyoxyalkylene groups.

BACKGROUND OF THE INVENTION

Concrete, mortar, asphalt, road base, well-drilling fluids and muds, and other construction materials often contain clays that are carried in the sand, rock, gravel, or other aggregates that are used for making these construction materials or that are often intermingled into these construction materials. Clays can adversely affect the properties and/or performance of construction materials because they absorb water and chemical agents used for treating these materials.

A method for mitigating the deleterious effects of clays is to wash the clay from the aggregates. However, excessive washing can remove a portion of fines (i.e., small aggregates) that otherwise benefits the performance or enhances a desired property of the construction material.

An objective of the present invention is to mitigate the deleterious effects of clays carried in aggregates while improving one or more properties of the construction materials. The present invention can lead to improvements in the properties of mortars and concretes (e.g., workability, strength), asphalts (e.g., binder demand), and road base materials (e.g., improved flowability). Reducing or eliminating washing steps can lead to greater beneficial fines content in construction materials.

Additional benefits can also be realized for clay stabilization in gas and oil well applications (involving fractured rock formations) to reduce water loss.

SUMMARY OF THE INVENTION

The present invention relates to clay-mitigating compositions and methods for modifying clays that are carried (or "born" or conveyed) or otherwise mixed within inorganic particulates such as sand aggregates, crushed stone (gravel, rocks, etc.), granulated slag, and other inorganic particles that are used in construction applications and in construction materials.

The clay-mitigation agents of the present invention may be incorporated into clay-bearing construction aggregates and materials such as mortar, concrete, asphalt, road base, and well bore drilling fluids and muds. The clay mitigation agents may be introduced into dry or wet aggregates.

In the case of hydratable cementitious compositions, the clay-mitigation methods and compositions of the present invention can provide improved workability without increasing water demand of cementitious binder systems. In the case of treating or washing aggregate materials, the inventive compositions can reduce the effort required for washing and/or removing of clay contained in the aggregates.

As summarized above, an exemplary carboxylate graft polymer composition of the present invention for treating clay or clay-bearing aggregates comprises:

(A) a first component represented by the following structure:

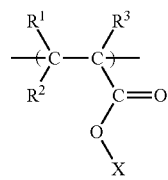

wherein $R^1$, $R^2$, and $R^3$ each independently represent hydrogen, $C_1$-$C_3$ alkyl, —COOH, —CH$_2$COOH, or mixtures thereof; X represents hydrogen or an alkali metal; and (B) a second component represented by the following structure:

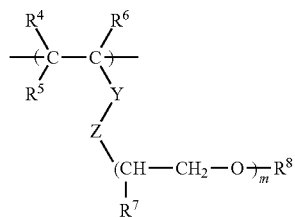

wherein $R^4$, $R^5$, $R^6$, $R^7$, and $R^8$ each independently represent hydrogen, $C_1$-$C_3$ alkyl, —COOH, or mixtures thereof; Y represents —O—, —COO—, —OOC—, —COHN—, or —NHCO—; Z represents (CH$_2$)$_n$ wherein "n" represents a whole number of 0 to 6; and "m" represents an integer of 25 to 200;

(C) optionally a third component comprising a repeating unit of polymerized (meth)acrylamide, N-alkyl (meth)acrylamide, N,N-dialkyl (meth)acrylamide, 3-acrylamido-2-methylpropane sulfonic acid or its salts, and styrene sulfonic acid or its salt, or mixtures thereof; and wherein the molar ratio of said first component A to said second component B is in the range of 50:100 to 100:40 and the weight-average molecular weight of the carboxylate graft polymer is in the range of 22,000 to 250,000; and wherein, if the molar ratio of said first component A to said second component B is greater than 100:55, then the weight-average molecular weight of the carboxylate graft polymer is in the range of 70,000 to 250,000.

Accordingly, the present invention also provides aggregate, cementitious, and admixture compositions containing the described carboxylate graft polymer composition. In other words, the above-described carboxylate graft polymer can be combined with a plurality of clay-bearing sand (natural or manufactured), crushed rock or gravel, drilling mud, or other clay-bearing aggregates used in construction to provide exemplary aggregate compositions of the invention. As another example, the above-described carboxylate graft polymer can be combined with a cementitious binder (e.g., Ordinary Portland Cement, argillaceous materials) to provide an exemplary cementitious composition of the invention. As yet another example, the above-described carboxylate graft polymer can be combined with at least one chemical admixture selected from the group consisting of water-reducing agent, set retarders, set accelerators, air entraining agents, air detraining agents, and mixtures thereof, to provide an exemplary admixture composition of the invention.

The present invention thus also provides methods for treating clay-bearing aggregates as well as construction materials and cementitious compositions containing clay and aggregates. Exemplary methods for treating clay or clay-bearing aggregates comprises introducing the above-described carboxylate graft polymer to clay or clay-bearing aggregates, or into construction materials containing aggregates and clay (which may have been borne by the aggregates).

Exemplary clay-mitigating carboxylate graft polymer compositions of the invention may be introduced to clay-bearing aggregates at the mine or quarry where aggregates are obtained and/or manufactured. They may also be introduced at the concrete mix plant wherein the aggregates are combined with cement to provide mortar or concrete compositions. They may also be added at any point before, during, or after these operations. The clay-mitigation compositions may also be introduced into crushed stone or rock which is contaminated with clay, such as crushed gravel or rocks from quarries which are prepared for road base or other construction use (e.g., foundations) and other construction applications.

The above-described clay-mitigation compositions can also be used, in other construction methods, such as in wellbore drilling applications, such as servicing wellbores using a wellbore servicing fluid, e.g., wellbore drilling (mud) fluid, mud displacement fluid, and/or wellbore cementing composition, to inhibit the swelling of argillaceous (shale or clay) material-containing subterranean formation penetrated by the wellbore.

The present invention thus relates to construction materials which comprise a plurality of aggregates, clay, and the carboxylate graft polymer described above.

Further advantages and benefits of the invention are described in further detail hereinafter.

DETAILED DESCRIPTION OF PREFERRED EMBODIMENTS

The present invention relates to clay-mitigation compositions and methods for treating clays contained in aggregates such as sand, crushed rock, crushed gravel, drilling mud (or other fluids pumped into well bore operations for recovering oil or gas), and other clay-bearing aggregates which are used in or as part of construction materials or operations.

In addition to clay-mitigation compositions containing the carboxylate graft polymer as summarized previously, the present invention also provides aggregate compositions (e.g., road base, asphalts), cementitious compositions containing aggregates (e.g., mortars, concretes), and well-bore drilling muds or fluids (some of which may or may not contain cementitious materials and/or aggregates; and/or which are flowed through clay-bearing rock or shale).

The present invention relates to treatment of all types of clays. The clays may include but are not limited to swelling clays of the 2:1 type (such as smectite type clays) or also of type 1:1 (such as kaolinite) or of the 2:1:1 type (such as chlorite). The term "clays" has referred to aluminum and/or magnesium silicates, including phyllosilicates having a lamellar structure; but the term "clay" as used herein may also refer to clays not having such structures, such as amorphous clays.

The present invention is also not limited to clays which absorb polyoxyalkylene superplasticizers (such as ones containing ethylene oxide ("EO") and/or propylene oxide ("PO") groups); but also includes clays that directly affect the properties of construction materials, whether in their wet or hardened state. Clays which are commonly found in sands include, for example, montmorillonite, illite, kaolinite, muscovite, and chlorite. These are included in the methods and compositions of the present invention.

Clay-bearing sands and/or crushed rock or gravel which are treated by the method of the present invention may be used in cementitious materials, whether hydratable or not, and such cementitious materials include mortar, concrete, and asphalt, which may be used in structural building and construction applications, roadways, foundations, civil engineering applications, as well as in precast and prefabrication applications.

The term "sand" as used herein shall mean and refer to aggregate particles usually used for construction materials such as concrete, mortar, and asphalt, and this typically involves granular particles of average size between 0 and 8 mm (e.g., not including zero), and, more preferably, between 2 and 6 mm. Sand aggregates may comprise calciferous, siliceous or siliceous limestone minerals. Such sands may be natural sand (e.g., derived from glacial, alluvial, or marine deposits which are typically weathered such that the particles have smooth surfaces) or may be of the "manufactured" type, which are made using mechanical crushers or grinding devices.

The term "cement" as used herein includes hydratable cement and Portland cement which is produced by pulverizing clinker consisting of hydraulic calcium silicates and one or more forms of calcium sulfate (e.g., gypsum) as an interground additive. Typically, Portland cement is blended with one or more supplemental cementitious materials, such as fly ash, granulated blast furnace slag, limestone, natural pozzolans, or mixtures thereof, and provided as a blend. The term "cementitious" refers to materials that comprise Portland cement or which otherwise function as a binder to hold together fine aggregates (e.g., sand), coarse aggregates (e.g., crushed stone, rock, gravel), or mixtures thereof.

The term "hydratable" is intended to refer to cement or cementitious materials that are hardened by chemical interaction with water. Portland cement clinker is a partially fused mass primarily composed of hydratable calcium silicates. The calcium silicates are essentially a mixture of tricalcium silicate ($3CaO.SiO_2$ "$C_3S$" in cement chemists notation) and dicalcium silicate ($2CaO.SiO_2$, "$C_2$") in which the former is the dominant form, with lesser amounts of tricalcium aluminate ($3CaO.Al_2O_3$, "$C_3A$") and tetracalcium aluminoferrite ($4CaO.Al_2O_3.Fe_2O_3$, "$C_4AF$"). See e.g., Dodson, Vance H., *Concrete Admixtures* (Van Nostrand Reinhold, New York N.Y. 1990), page 1.

The term "mortar" usually refers to a hydratable cementitious mixture comprising a cementitious binder and a fine aggregate that is typically sand, and water is added to initiate hydration of the cement and hardening of the mixture. A "concrete" comprises the cementitious binder, sand, and further comprises a coarse aggregate such as crushed stone, rock, or gravel. Both mortars and concrete may additionally contain one or more chemical admixtures. As clays may be contained in the sand used for making the mortar or concrete, such mortars and concretes may in a sense to describe as both clay-bearing aggregate compositions as well as hydratable cementitious compositions which contain aggregates and clay.

As summarized previously, an exemplary carboxylate graft polymer composition of the present invention for treating clay or clay-bearing aggregates comprises:

(A) a first component represented by the following structure:

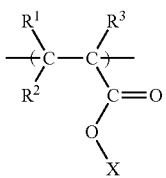

wherein $R^1$, $R^2$, and $R^3$ each independently represent hydrogen, $C_1$-$C_3$ alkyl, —COOH, —CH$_2$COOH, or mixtures thereof; X represents hydrogen or an alkali metal; and (B) a second component represented by the following structure:

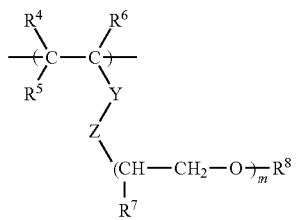

wherein $R^4$, $R^5$, $R^6$, $R^7$, and $R^8$ each independently represent hydrogen, $C_1$-$C_3$ alkyl, —COOH, or mixtures thereof; Y represents —O—, —COO—, —OOC—, —COHN—, or —NHCO—; Z represents (CH$_2$)$_n$ wherein "n" represents a whole number of 0 to 6; and "m" represents an integer of 25 to 200;

(C) optionally a third component comprising a repeating unit of polymerized (meth)acrylamide, N-alkyl (meth)acrylamide, N,N-dialkyl (meth)acrylamide, 3-acrylamido-2-methylpropane sulfonic acid or its salts, and styrene sulfonic acid or its salt, or mixtures thereof; and wherein the molar ratio of said first component A to said second component B is in the range of 50:100 to 100:40 and the weight-average molecular weight of the carboxylate graft polymer is in the range of 22,000 to 250,000; and wherein, if the molar ratio of said first component A to said second component B is greater than 100:55, then the weight-average molecular weight of the carboxylate graft polymer is in the range of 70,000 to 250,000.

In preferred embodiments, the above-described carboxylate graft polymer composition further comprises at least one repeating unit of the identified component "C" compounds selected from repeating unit of polymerized (meth)acrylamide, N-alkyl (meth)acrylamide, N,N-dialkyl (meth)acrylamide, 3-acrylamido-2-methylpropane sulfonic acid or its salts, and styrene sulfonic acid or its salt, or mixtures thereof.

In preferred carboxylate graft polymer compositions, the molar ratio of component A to component B is between 0.6 and 1.8, and more preferably between 0.7 and 1.5; and the weight-average molecular weight of said carboxylate graft polymer composition is preferably in the range of 70,000 to 150,000. The number-average molecular weight of said component B is in the range of 1,000 to 10,000; preferably in the range of 2,000 to 5,000 and most preferably, it is in the range of 1,500 to 7,500.

The carboxylate graft polymer of the invention can be formed either by direct polymerization of a carboxylate monomer of component A with a polyoxyalkylene macromonomer of component B, optionally with an unsaturated monomer of component C; or by grafting of polyoxyalkylene groups onto a carboxylic polymer.

Carboxylate monomers of component A can be selected, for example, from a list including acrylic acid, methacrylic acid, crotonic acid, maleic acid, fumaric acid, itaconic acid, anhydride or salt of these acids, or mixtures thereof.

Examples of polyoxyalkylene macromonomer of component B include, without limitation, polyoxyalkylene acrylate ester, polyoxyalkylene methacrylate ester, polyoxyalkylene maleate ester, polyoxyalkylene fumarate ester, polyoxyalkylated $C_2$ to $C_7$ unsaturated alcohol, N-polyoxyalkylene acrylamide, N-polyoxyalkylene methacrylamide, or mixtures thereof.

Examples of unsaturated monomer of component C include, without limitation, acrylamide, methacrylamide, N-alkyl acrylamide, N-alkyl methacrylamide, N,N-dialkyl acrylamide, N,N-dialkyl methacrylamide, vinylsulfonic acid, allysulfonic acid, methallylsulfonic acid, 3-acrylamido-2-methylpropane sulfonic acid, styrene sulfonic acid, salts of these acids, or mixtures thereof.

Alternatively, the carboxylate graft polymer of the invention can be prepared by grafting of the polyoxyalkylene groups onto a carboxylic acid or anhydride polymer. The carboxylic polymer includes homo- or copolymer of acrylic acid, methacrylic acid, crotonic acid, maleic acid, fumaric acid, itaconic acid, anhydride or salt of these acids, or mixtures thereof. The chemical linkage of the polyoxyalkylene and the carboxylic polymer can be an ester, amide, imide, or mixtures thereof.

In preferred methods and compositions of the invention, carboxylate graft polymers of the present invention have little or no water reducing ability when used in hydratable cementitious compositions such as concrete, mortar, and cements. In other words, carboxylate graft polymers of the invention should not be superplasticizers, and most preferably they should not have the ability to confer significant slump increase either initially or over time. Any increase slump in plastic hydratable cementitious compositions such as cement, mortar, or concrete should be 0-4 inches (using standard inverted slump cone measurement); more preferably, less than 3 inches; and, most preferably, less than 2 inches, at normal dosage range (i.e., 0.08 to 0.15% dry polymer weight to dry cement weight), as compared to a control concrete mix that does not contain a water-reducing admixture. In addition, it is preferred that the slump of plastic concrete containing the carboxylate graft polymers of the invention does not exhibit an increase in slump over time. Hence, exemplary clay-mitigating compositions, cementitious compositions, and aggregate compositions of the invention contain the carboxylate graft polymer which increases slump 0-4 inches, more preferably 0-3 inches, and most preferably 0-2 inches (using slump cone standard, e.g., ASTM C143 (which the inventors believed was last updated in 2010 but which has used the same cone for many years).

Exemplary aggregate compositions of the present invention comprise a plurality of clay-bearing aggregates and the above-described carboxylate graft polymer composition. The aggregates may comprise, for example, clay-bearing aggregates including natural or manufactured sand, crushed stone, crushed gravel, crushed rock, crushed shale, or mixtures thereof. Such aggregate compositions may further comprise a cementitious binder.

The carboxylate graft polymer can be used in the plurality of clay-bearing aggregates in an amount of 0.1% to 100% by weight based on dry weight of clay contained in the plurality of aggregates, and more preferably in an amount of 1% to 50% by weight based on dry weight of clay contained in said plurality of aggregates.

Exemplary admixture compositions of the present invention comprise the above described clay-mitigating carboxylate graft polymer and one or more conventional chemical admixtures. The admixtures include, without limitation, water reducing agents (such as lignin sulfonate, naphthalene sulfonate formaldehyde condensate (NSFC), melamine sulfonate formaldehyde condensate (MSFC), polycarboxylate comb polymers (containing alkylene oxide groups such as ethylene oxide ("EO") and/or propylene oxide ("PO") groups), gluconic acid and/or gluconate, and the like); set retarders; set accelerators; defoamers; air entraining agents; surface active agents; and mixtures thereof.

Admixtures that include EO-PO type polymers, e.g., which have EO and/or PO groups, and polycarboxylic acid and/or salt groups, are preferred.

Exemplary cement dispersants (admixtures) contemplated for use in methods and compositions of the invention include EO-PO polymers and EO-PO comb polymers, as described for example in U.S. Pat. Nos. 6,352,952 B1 and 6,670,415 B2 of Jardine et al., which mentioned the polymers taught in U.S. Pat. No. 5,393,343 (assigned to W. R. Grace & Co.-Conn.). Another exemplary cement dispersant polymer, also containing EO/PO groups, is obtained by polymerization of maleic anhydride and an ethylenically-polymerizable polyalkylene, as taught in U.S. Pat. No. 4,471,100. In addition, EO/PO-group-containing cement dispersant polymers are taught in U.S. Pat. Nos. 5,661,206 and 6,569,234. The amount of such polycarboxylate cement dispersants used within concrete may be in accordance with conventional use (e.g., 0.05% to 0.25% based on weight of active polymer to weight of cementitious material).

The dosage of dispersant admixtures and any other admixtures within the compositions of the invention will depend on application, nature and quality of the cement, water/cement ratio, temperature, application objectives, other admixtures employed, and other factors typically considered by the construction worker/artisan.

Suitable water-reducing admixtures, suitable for use with the carboxylate graft polymers of the present invention, are available from Grace Construction Products, Cambridge, MA, under the trade name "ADVA."

Thus, an exemplary admixture composition for modifying a cementitious composition comprises:

(i) at least one chemical admixture selected from the group consisting of water-reducing agent, set retarders, set accelerators, air entraining agents, air detraining agents, and mixtures thereof; and (ii) a carboxylate graft polymer composition for treating clay or clay-bearing aggregates, comprising:

(A) a first component represented by the following structure:

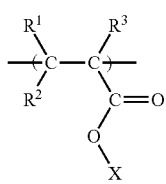

wherein $R^1$, $R^2$, and $R^3$ each independently represent hydrogen, $C_1$-$C_3$ alkyl, —COOH, —$CH_2$COOH, or mixtures thereof; X represents hydrogen or an alkali metal; and (B) a second component represented by the following structure:

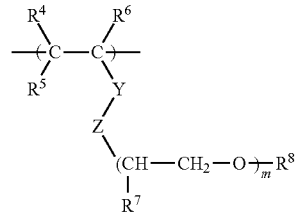

wherein $R^4$, $R^5$, $R^6$, $R^7$, and $R^8$ each independently represent hydrogen, $C_1$-$C_3$ alkyl, —COOH, or mixtures thereof; Y represents —O—, —COO—, —OOC—, —COHN—, or —NHCO—; Z represents $(CH_2)_n$ wherein "n" represents a whole number of 0 to 6; and "m" represents an integer of 25 to 200;

(C) optionally a third component comprising a repeating unit of polymerized (meth)acrylamide, N-alkyl (meth)acrylamide, N,N-dialkyl (meth)acrylamide, 3-acrylamido-2-methylpropane sulfonic acid or its salts, and styrene sulfonic acid or its salt, or mixtures thereof;

wherein the molar ratio of said first component A to said second component B is in the range of 50:100 to 100:40 and the weight-average molecular weight of the carboxylate graft polymer is in the range of 22,000 to 250,000; and wherein, if the molar ratio of said first component A to said second component B is greater than 100:55, then the weight-average molecular weight of the carboxylate graft polymer is in the range of 70,000 to 250,000.

An exemplary method of the present invention for treating clay or clay-bearing aggregates comprises introducing to clay or to clay-bearing aggregates (such as mortar or concrete aggregates, asphalt aggregates, road base aggregates) in an amount of 0.1% to 100% by weight based on dry weight of the clay being treated, the carboxylate graft polymer as described above.

The carboxylate graft polymer also preferably has a weight-average molecular weight of 22,000 to 250,000, and more preferably more than 70,000, as measured by aqueous gel permeation chromatography (GPC) using poly(ethylene glycol) as calibration standard. A Waters 1500 series system equipped with three columns and a refractive index detector was employed. GPC columns are commercially available from Waters Corporation, under the trade names ULTRAHYDROGEL™ 120, ULTRAHYDROGEL™ 250 and ULTRAHYDROGEL™ 500. The GPC processing conditions are as follows: 0.1 M aqueous potassium nitrate as elution solvent, flow rate of 0.8 mL/min, injection volume of 10 μL, and column temperature at 30° C.

In further exemplary embodiments, carboxylate graft polymers are introduced to clay contained in aggregates (e.g., mortar or concrete aggregates, asphalt aggregates, road base aggregates), in the amount of 0.1% to 100% (as previously mentioned), more preferably in an amount of 1% to 50%, and most preferably in an amount of 2% to 25% by weight based on dry weight of the clay contained in said aggregates.

It is understood that the foregoing description of an aggregate composition applies to a clay-bearing plurality of aggregates which may be in a dry pile state (e.g., located in supply piles at the mine or quarry or concrete plant, located at a preparation site for installation as road base, etc.) or may be within a wet cementitious slurry (e.g., concrete, mortar). With respect to dry aggregate compositions of the present invention containing the carboxylate graft polymer (which is deposited upon or mixed into the aggregates), an exemplary method of the present invention for modifying cementitious compositions comprises combining the dry aggregate containing the carboxylate graft polymer with a cementitious binder.

In further exemplary embodiments, the admixture compositions comprise at least one chemical admixture selected from the group of oxyalkylene-containing water-reducing admixture, shrinkage reducing admixture, or mixture thereof, in combination with said carboxylate graft polymer. Exemplary methods of the invention comprise combining said admixture compositions with a hydratable cementitious binder, either before, during, or after combining said cementitious binder with clay-bearing aggregates to create a mortar or concrete material.

For construction materials generally, the carboxylate graft polymers of the present invention may be introduced to aggregates (e.g., sand) by application to the clay-bearing aggregates at the quarry or mine; by application at the concrete mix plant where the aggregates are combined with cement to form hydratable mortar or concrete; or by application at an asphalt plant wherein clay-bearing aggregates are combined with bituminous binder. The carboxylate graft polymers of the present invention may also be incorporated into the aggregates at the concrete mix plant before the cement binder is added or into dry or wet mortar or concrete containing the aggregates. Additionally, the polymer may be used together with conventional concrete admixtures such as water reducers (such as superplasticizers), set retarders, set accelerators, air detraining agents, air entraining agent, shrinkage reducing agents, crack control agents, strength enhancing agents, fibers, and the like.

Concerning gas and oil well applications, the functionalized water-soluble polyamines of the present invention may be introduced into the aqueous well bore cement slurry or drilling fluid or mud, which in turn stabilizes subterranean clay-bearing formations.

As mentioned in the summary, the above-described carboxylate graft polymer can also be used in wellbore drilling applications, such as wellbore mud drilling fluid and/or wellbore cementing compositions and methods for servicing wellbores. Natural resources such as gas, oil, and water residing in subterranean formations or zones are usually recovered by drilling a wellbore down to the subterranean formation while circulating a drilling fluid (also known as a drilling mud) through the drill pipe and the drill bit and upwardly through the wellbore to the surface. The drilling fluid serves to lubricate the drill bit and carry drill cuttings back to the surface. After the wellbore is drilled to the desired depth, the drill pipe and drill bit are typically withdrawn from the wellbore while the drilling fluid is left in the wellbore while the drilling fluid is left in the wellbore to provide hydrostatic pressure on the formation penetrated by the wellbore and thereby prevent formation fluids from flowing into the wellbore. Next, the wellbore drilling operation involves running a string of pipe, e.g., casing, in the wellbore. Primary cementing is then typically performed whereby a cement slurry is pumped down through the string of pipe and into the annulus between the string of pipe and the walls of the wellbore, whereby the drilling mud is displaced, and the cement slurry sets into a hardened mass (i.e., sheath) and thereby seals the annulus.

The present inventors believe that the above-described carboxylate graft polymer is suitable for use as a clay mitigating agent in aqueous wellbore drilling fluid (mud) compositions and/or wellbore cementing compositions. Among the advantages or purposes of doing this is to stabilize argillaceous formations like shales and/or clays in the wellbore which could otherwise be weakened and displaced by water in the aqueous wellbore mud. Because of the saturation and low permeability of a shale formation, penetration of a small volume of wellbore fluid into the formation can result in a considerable increase in pore fluid pressure near the wellbore wall, which, in turn, can reduce the effective cement support, which leads to a less stable wellbore condition.

Thus, the present invention also concerns a method for servicing a wellbore comprising: introducing to a wellbore formation an aqueous wellbore servicing fluid (e.g., drilling mud, spacer fluid, mud displacement fluid, cementing composition, or combination thereof) comprising the above-described carboxylate graft polymer.

In addition to the carboxylate graft polymer, the exemplary drilling mud or cementing composition can further contain conventional cementitious compositions, surfactants, or combinations thereof. For example, the cementitious composition may comprise a cement such as a hydraulic cement (as previously defined above), and this cement may include calcium, aluminum, silicon, oxygen, and/or sulfur and which sets and hardens by reaction with water. Examples of hydraulic cements include but are not limited to Portland cements (e.g., classes A, C, G, and H Portland cements), pozzolan cements, high alumina cements, silica cements, high alkalinity cements, and combinations thereof.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples.

All parts and percentages in the examples, as may be set forth herein and hereinafter, are by percentage dry weight unless otherwise specified.

EXAMPLE 1

Into a reaction vessel equipped with a thermometer, stirrer, nitrogen inlet tube, reflux condenser and two dropping devices, 164.41 g of distilled water was charged. The reaction vessel was purged with nitrogen and heated to 86° C. Two separate solutions were prepared. Solution A contained 105.5 g of distilled water, 2.65 g of ammonium persulfate and 8.84 g of 35% hydrogen peroxide. Solution B contained 428.42 g of aqueous polyoxyethylene methyl ether methacrylate (Mw=3,068, 60.9% solution), 5.29 g of methacrylic acid, 7.96 g of acrylic acid and 1.77 g of 3-mercaptopropionic acid.

While reaction vessel temperature was maintained around 86° C., both solution A and solution B were added drop-wise over periods of 3.5 hours and 3.0 hours, respectively. After the addition, the reaction was continued for 2 hours at 86° C.; then the mixture was cooled. To neutralize the mixture, 6.7g of 50% aqueous sodium hydroxide solution was added at 70° C. The resulting material is designated as P-9.

Aqueous Gel Permeation Chromatography (GPC) measurement of the resulting carboxylate graft polymer indicated a weight-average molecular weight of 139,000 for the polymer peak using polyethylene glycol (PEG) as standard for calibration. The GPC columns used were obtained from Waters Corporation, Massachusetts, USA, and had the trade names ULTRAHYDROGEL™ 120, ULTRAHYDROGEL™ 250 and ULTRAHYDROGEL™ 500. The GPC processing conditions were as follows: 0.1M aqueous potassium nitrate as elution solvent, flow rate of 0.8 mL/min, injection volume of 10 μL, column temperature at 30° C., and refractive index detection for a Waters 1500 series system.

Using the above procedures, carboxylate polymer samples were synthesized, designated as "P-#", and characteristics were summarized, along with commercial polymers (reference) designated as "R-#", in Table 1 below.

TABLE 1

| Description | A/B molar ratio | Molecular weight of component B | Polymer peak [Mw, k] |
|---|---|---|---|
| P-1 | 1.2 | 3000 | 139 |
| P-2 | 2.0 | 2000 | 21 |
| P-3 | 1.5 | 2000 | 20 |
| P-4 | 2.0 | 5000 | 19 |
| P-5 | 1.5 | 5000 | 20 |
| P-6 | 2.0 | 2000 | 54 |
| P-7 | 1.5 | 2000 | 44 |
| P-8 | 1.2 | 3000 | 47 |
| P-9 | 2.0 | 5000 | 79 |
| P-10 | 1.5 | 2000 | 10 |
| P-11 | 1.5 | 5000 | 15 |
| P-12 | 1.3 | 3000 | 49 |
| P-13 | 1.5 | 5000 | 69 |
| P-14 | 1.5 | 5000 | 83 |
| P-15 | 1.5 | 5000 | 104 |
| P-16 | 1.5 | 5000 | 143 |
| R-1 | 4.3 | 2000 | 37 |
| R-2 | 2.3 | 2000 | 38 |

EXAMPLE 2

To demonstrate the ability of carboxylate graft polymers of the present invention to minimize increases in slump, non-clay-bearing sand was used to make concrete samples. The concrete samples included a control which contained no carboxylate graft polymer, a commercial polycarboxylate polymer (prior art used as a reference), and a synthesized carboxylate graft polymer of the present invention. Synthesized carboxylate graft polymers in this example were in the lower range of main peak molecular weights for commercially available polycarboxylate polymers.

The concrete mix design included the following components: Cement—391 kg/m³ with an alkali equivalent of 0.49% and a free calcium oxide content of 1.39%; Sand—800 kg/m³; Stone—1068 kg/m³; Water—157 kg/m³ for a water-to-cement ratio of 0.40. The dosage for the polymers (either the carboxylate graft polymer of the invention or commercially available polycarboxylate polymer) was 0.11% actives/cement wt. Each concrete mix was treated with air detraining agent.

The mixing procedure was as follows: (1) mix sand, stone, and water for one minute; (2) add cement and mix for two minutes; (3) add polymer and mix for two minutes; (4) stop mixer and rest for three minutes; and (5) re-mix for 2 minutes. After mixing, the slump, air content and the 1-, 7-, and 28-day compressive strength of the concrete samples were measured. Results are shown in Table 2.

TABLE 2

| Polymer | Slump (mm) | Air (%) | Compressive strength (MPa) at | | |
|---|---|---|---|---|---|
| | | | 1 day | 7 days | 28 days |
| Blank | 10 | 2.7 | 24 | 35 | 41 |
| R-1 | 220 | 1.6 | 26 | 39 | 48 |
| R-2 | 250 | 1.5 | 27 | 44 | 49 |
| P-2 | 200 | 3.0 | 26 | 43 | 48 |
| P-3 | 60 | 3.7 | 21 | 39 | 46 |
| P-4 | 40 | 3.2 | 20 | 35 | 42 |
| P-5 | 10 | 3.3 | 21 | 38 | 44 |

To minimize increases in slump, the present inventors discovered that the A/B molar ratio must be decreased below 2.0 (P-2 compared to P-3) or the molecular weight of component B must be increased above 2000 (P-2 compared to P-4). The present inventors discovered that the carboxylate graft polymer with the lowest A/B molar ratio and greatest molecular weight of component B exhibited the lowest slump (P-5).

EXAMPLE 3

To demonstrate further the ability of the carboxylate graft polymer to minimize increases in slump, the present inventors conducted a second set of experiments using the same mix design and protocol of Example 2. In this example, the synthesized carboxylate graft polymers were either in the high range of main peak molecular weights for commercially available polycarboxylates or higher. The results are shown in Table 3.

TABLE 3

| Polymer | Slump (mm) | Air (%) | Compressive strength (MPa) at | | |
|---|---|---|---|---|---|
| | | | 1 day | 7 days | 28 days |
| Blank | 10 | 2.7 | 24 | 35 | 41 |
| R-1 | 220 | 1.6 | 26 | 39 | 48 |
| R-2 | 250 | 1.5 | 27 | 44 | 49 |
| P-6 | 230 | 1.7 | 24 | 43 | 49 |
| P-7 | 220 | 3.5 | 26 | 36 | 50 |
| P-8 | 90 | 2.5 | 24 | 41 | 47 |
| P-9 | 40 | 2.7 | 21 | 37 | 45 |
| P-1 | 30 | 3.0 | 20 | 35 | 41 |

In this example, to obtain least slump increase in the concrete mix, the present inventors discovered that the A/B molar ratio must be decreased below 2.0 (P-6 and P-7 compared to P-8) or the molecular weight of component B must be increased above 2000 (P-6 compared to P-9). Increasing the main peak molecular weight was also seen to minimize slump (P-9 compared to P-1).

EXAMPLE 4

To demonstrate the ability of carboxylate graft polymers of the present invention to function as clay mitigation agents, the present inventors tested concrete using sand doped with clay and compared performance against known clay-mitigating agent involving the polycondensates of epichlorohydrin and dimethylamine (hereinafter "EPI-DMA"). The carboxylate graft polymers used as potential clay mitigating agents were chosen to have low ability in increasing slump and a range of main peak molecular weights.

The concrete mix design included the following components: Cement—445 kg/m³ with an alkali equivalent of 0.49% and a free calcium oxide content of 1.39%; Sand—884 kg/m³; Clay—sodium montmorillinite, 1.15 g/m³ (0.13% solids/sand); Stone—886 kg/m³; Water—184 kg/m³ for a water-to-cement ratio of 0.41; Polycarboxylate superplasticizer formulated with a defoamer—0.145 wt % solids/cement. The dosage for the clay mitigation agents was 10% solids/clay.

The mixing procedure was as follows: (1) mix sand, clay, ⅓of mixing water and clay mitigating agent together for five minutes; (2) add stone and mix for one minute; (3) add cement and mix for two minutes; (4) add polymer and mix for two minutes; (5) stop mixer and rest for three minutes; (6) re-mix for 2 minutes. After mixing, the slump flow (diameter of the spread), air content and the 1-, 7-, and 28-day compressive strength of the concrete were determined. The results are shown in Table 4.

TABLE 4

| Clay mitigating agent | Slump (mm) | Air (%) | Compressive strength (MPa) at | | |
|---|---|---|---|---|---|
| | | | 1 day | 7 days | 28 days |
| EPI-DMA | 640 | 1.9 | 25 | 38 | 51 |
| P-10 | 480 | 2.8 | 26 | 41 | 48 |
| P-11 | 560 | 2.4 | 26 | 38 | 48 |
| P-3 | 580 | 2.4 | 26 | 37 | 49 |
| P-2 | 630 | 2.1 | 27 | 41 | 47 |
| P-12 | 650 | 2.1 | 25 | 42 | 46 |
| P-13 | 670 | 2.0 | 26 | 40 | 48 |
| P-14 | 650 | 2.1 | 25 | 39 | 47 |
| P-15 | 650 | 2.0 | 25 | 42 | 49 |
| P-16 | 690 | 1.8 | 26 | 40 | 49 |

The higher the main peak molecular weight, the more effective the carboxylate graft polymer was in mitigating clay. At a main peak molecular weight of around 50,000, the performance of known clay mitigating agent EPI-DMA was exceeded.

EXAMPLE 5

To demonstrate clay-mitigating ability of carboxylate graft polymer to minimize increase in slump flow, the present inventors tested concrete using the mix design and protocol of Example 4. Two polymers were compared: P-6, a typical water-reducing polycarboxylate; and P-1, the carboxylate graft polymer. Dosages of each were increased from 10 to 40% solids/clay; and segregation of the mix was checked visually. Results are summarized in Table 5.

TABLE 5

| Dose | Slump flow (mm) | | Air (%) | |
|---|---|---|---|---|
| [% s/clay] | P-6 | P-1 | P-6 | P-1 |
| 0, with clay | 480 | | 2.5 | |
| 10 | 620 | 650 | 1.8 | 1.8 |
| 20 | 700 | 670 | 1.5 | 1.6 |
| 30 | 720* | 710 | 0.9 | 1.5 |
| 40 | 740* | 710 | 1.8 | 1.5 |
| 0, without clay | 710 | | 1.4 | |

*indicates a visibly segregated mix

Both polymers mitigated the clay effect. A 10% dose, P-1 was more effective than P-6. However, as dosage increased, due to dispersing effect of P-6, slump flow continued to increase beyond that of concrete without clay. This uncontrolled increase in workability translated to visible segregation of the concrete. P-1, however, with only clay-mitigating properties, restored workability and provided no additional dispersion.

The foregoing examples and embodiments were presented for illustrative purposes only and not intended to limit the scope of the invention.

The invention claimed is:

1. A method for modifying cementitious materials containing clay-bearing aggregates, comprising:
   mixing with a cementitious binder and a plurality of clay-bearing aggregates a carboxylate graft polymer to form a plastic hydratable cementitious composition in which the carboxylate graft polymer effects a slump increase of 0-4 inches at a dosage range of 0.08% to 0.15% by dry polymer weight to dry cement weight, where slump is measured in accordance with ASTM C143, the carboxylate graft polymer comprising:
   (A) a first component represented by the following structure:

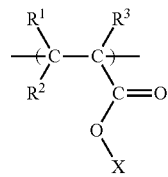

wherein $R^1$, $R^2$, and $R^3$ each independently represent hydrogen, $C_1$-$C_3$ alkyl, —COOH, —CH$_2$COOH, or mixtures thereof; X represents hydrogen or an alkali metal; and (B) a second component represented by the following structure:

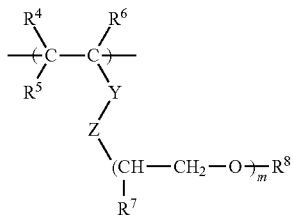

wherein $R^4$, $R^5$, $R^6$, $R^7$, and $R^8$ each independently represent hydrogen, $C_1$-$C_3$ alkyl, —COOH, or mixtures thereof; Y represents —O—, —COO—, —OOC—, —COHN—, or —NHCO—; Z represents $(CH_2)_n$ wherein "n" represents a whole number of 0 to 6; and "m" represents an integer of 25 to 200;

(C) optionally a third component comprising a repeating unit of polymerized (meth)acrylamide, N-alkyl (meth)acrylamide, N,N-dialkyl (meth)acrylamide, 3-acrylamido-2-methylpropane sulfonic acid or its salts, and styrene sulfonic acid or its salt, or mixtures thereof; and
   wherein the molar ratio of said first component A to said second component B is in the range of 0.5 to 1.5; and
   wherein the weight-average molecular weight of the carboxylate graft polymer is in the range of 70,000 to 150,000; and
   wherein the carboxylate graft polymer is mixed with said plurality of clay-containing aggregates in an amount of 1% to 50% by weight based on dry weight of clay contained in said plurality of aggregates, and thereby mitigates the effect of the clay contained in said aggregates upon superplasticizing carboxylate polymers which are combined into the plastic hydratable cementitious composition and which would otherwise be absorbed by the clay; and mixing with said cementitious binder, said plurality of clay-bearing aggregates and said carboxylate graft polymer, a superplasticizing carboxylate polymer.

2. The method of claim 1 wherein the carboxylate graft polymer further comprises at least one repeating unit of a polymerized (meth)acrylamide, N-alkyl (meth)acrylamide, N,N-dialkyl (meth)acrylamide, 3-acrylamido-2-methylpropane sulfonic acid or its salts, and styrene sulfonic acid or its salt, or mixtures thereof.

3. The method of claim 1 wherein the plurality of clay-bearing aggregates comprises natural or manufactured sand, crushed stone, crushed gravel, crushed rock, crushed shale, or mixtures thereof.

4. The method of claim 1 wherein said cementitious composition comprising the carboxylate graft polymer further comprises at least one chemical admixture selected from the group consisting of water-reducing agent, set retarders, set accelerators, air entraining agents, air detraining agents, and mixtures thereof.

5. The method of claim 1 wherein the carboxylate graft polymer is added to the clay-bearing aggregates before being added to the cementitious binder.

6. The method of claim 1 wherein the carboxylate graft polymer effects a slump increase of less than 3 inches.

7. The method of claim 1 wherein the carboxylate graft polymer is incorporated into clay-bearing aggregates together with said superplasticizing carboxylate polymer.

8. The method of claim 1 wherein the wherein the carboxylate graft polymer is incorporated into clay-bearing aggregates before cement binder is added.

* * * * *